United States Patent [19]
Ecktman

[11] Patent Number: 6,036,180
[45] Date of Patent: Mar. 14, 2000

[54] TEAR-DROP SHAPED CLAMP ASSEMBLY AND TAPERED END CAP FOR AN AIR SPRING

[75] Inventor: Jack D. Ecktman, Indianapolis, Ind.

[73] Assignee: Bridgestone/Firestone, Inc., Akron, Ohio

[21] Appl. No.: 09/030,986

[22] Filed: Feb. 26, 1998

[51] Int. Cl.⁷ .................................................. F16F 9/04
[52] U.S. Cl. ....................................................... 267/64.27
[58] Field of Search ............................ 267/64.19, 64.21, 267/64.23, 64.24, 64.27, 119, 122; 277/101, 103, 212 F, 212 FB, 213; 280/124.157, 124.158

[56] References Cited

U.S. PATENT DOCUMENTS

| | | | |
|---|---|---|---|
| 2,361,575 | 10/1944 | Thompson | 267/65 |
| 4,662,615 | 5/1987 | Paton | 267/64.24 |
| 4,718,649 | 1/1988 | Pohlmann et al. | 267/64.24 |
| 4,852,861 | 8/1989 | Harris | 267/64.27 |
| 4,899,995 | 2/1990 | Hoffman et al. | 267/64.27 |
| 4,946,144 | 8/1990 | Geno et al. | 267/64.27 |
| 5,374,037 | 12/1994 | Bledsoe | 267/64.27 |

FOREIGN PATENT DOCUMENTS

| | | | |
|---|---|---|---|
| 41 18 576 A1 | of 0000 | Germany . | |
| 1372127 | 2/1988 | U.S.S.R. | 267/64.27 |

*Primary Examiner*—Chris Schwartz
*Attorney, Agent, or Firm*—John M. Vasuta; Michael Sand

[57] ABSTRACT

An air spring has a pair of axially spaced end members and an intervening elastomeric sleeve extending therebetween which forms a fluid pressure chamber. An annular clamp ring having a smooth inner diameter coacts with an annular wall on the end members, which has an outer diameter with annular indentations formed therein to clamp the ring thereto. The clamp ring is of a tear-drop shape which corresponds to the general conical shape of the end members so as to provide greater fabric displacement, ring/component interference as opposed to clearance, larger stress area, and a self-locking mechanism.

18 Claims, 2 Drawing Sheets

TEAR-DROP SHAPED CLAMP ASSEMBLY AND TAPERED END CAP FOR AN AIR SPRING

BACKGROUND OF THE INVENTION

1. Technical Field

The invention relates to air actuators and more particularly to the clamping means adapted to affix a resilient elastomeric sleeve member to at least one of the relatively rigid end caps on at least one end of the air actuator embodied as on an air spring. Specifically, the invention relates to a clamp assembly for an air actuator and/or air spring employing annular recesses or indentations along a conically tapered region in the end caps to form a series of pinch areas with the intervening sleeve member which sealingly clamp the sleeve therebetween when a clamping ring of tear-drop or similar rounded, right triangular shape with smooth inner contact surfaces is crimped thereover.

2. Background Information

Pneumatic assemblies such as air actuators and springs, have been used for many years for various purposes. The air actuator usually consists of a flexible rubber sleeve or bellows containing a supply of compressed fluid and a feed for increasing or decreasing the compressed fluid therein. The flexible sleeve is formed of a flexible elastomeric material often containing reinforcing cords, where the flexibility of the material permits a first end cap to move axially with respect to another end cap secured within the ends of the sleeve as the amount of compressed fluid is changed. Since the air actuator is positioned in between a movable or actuatable object and typically a fixed object, the movable object moves in correlation to this axial movement.

As to pneumatic springs commonly referred to as air springs, the construction is similar with a flexible rubber sleeve or bellows containing a supply of compressible fluid. However, the air spring has one or more pistons movable with respect to the flexible sleeve. The piston causes compression and expansion of the fluid within the sleeve as the sleeve stretches or retracts, respectively, thereby absorbing shock loads and/or dampening vibrations. The flexible sleeve is formed of a flexible elastomeric material containing reinforcing cords and this permits the piston to move axially with respect to another piston or end cap secured within open ends of the sleeve. One application for air springs is with motor vehicles where the spring provides cushioning between moveable parts of the vehicle, primarily to absorb shock loads impressed on the vehicle axles by the wheels striking an object in the road or falling into a depression.

In either air actuators or air springs, the ends of the sleeves are sealingly connected to the opposed end caps, or the piston and opposite end cap, respectively, and are always one of the important and major aspects in producing an efficient and maintenance-free air actuator or spring. One problem with certain air actuators or springs is the ineffective sealing and/or clamping of the flexible sleeve to the end caps resulting in a lack of an air-tight seal.

Another and related problem with existing air actuators and springs is that the ineffective sealing and/or clamping often results in either or both failure of the sleeve to remain clamped and/or rupture or tearing and thus failure of the sleeve.

Another problem with existing air actuators and springs is the inability to clamp and grip the flexible sleeve so as to accept high pressures within the fluid pressure chamber within the end-capped flexible sleeve.

Another problem with existing air actuators and springs is that the exposed cut edge at the end of the elastomeric sleeve of the air actuator or spring will engage the sleeve body as it rolls along the piston or end cap in excessive stroke conditions causing excess wear to the flexible sleeve.

Another problem with existing air actuators and springs is edges on the clamping ring or surrounding parts that are not smooth or radiused to provide a surface that does not excessively wear or tear the flexible sleeve.

Another problem with existing air actuators and springs is the inability to force or flow sufficient rubber from the sleeve into the grooves on either or both the clamp ring and end cap as is needed for sufficient clamping to occur.

Another and related problem with existing air actuators and springs is the lack of an interference fit between the ring and end cap.

Another and related problem with existing air actuators and springs is the lack of a sufficient stress area along the ring-end cap interface in which to distribute the stress and strain on the ring.

Another and related problem with existing air actuators and springs is non-optimal force distribution between the ring and end cap.

Another and related problem with existing air actuators and springs is insufficient sleeve displacement during crimping.

Another problem with existing air actuators and springs is that failure of a component end seal at the sandwiching of the sleeve between the clamp ring and the end cap, or failure of an end cap or piston is typically the result when overpressure occurs and is less desirable versus a sidewall burst of the sleeve.

Another problem with existing air actuators and springs is ineffective holding by the pinch areas, that is the rubber forced into the grooves on either or both the clamp ring and end cap, as is needed for effective high pressure sealing.

Another problem with existing air actuators and springs, and in particular, the clamp ring therefore, is that the clamp ring will move in its clamped position under dynamic conditions causing movement of the clamped elastomeric material therebetween tending to loosen the sealing engagement and deteriorating the clamp integrity and causing ultimate leakage and failure. This ring movement is especially critical during the jounce or collapsing stroke.

Another problem with existing air actuators and springs and the clamping of the elastomeric sleeve ends to the piston member and/or end cap is to secure a sufficiently tight seal to be able to withstand high fluid pressures contained in the fluid chamber without premature leakage or bursting even upon experiencing severe air spring movement and being exposed to the harsh environments on the undercarriage of a vehicle.

Another problem with existing air actuators and springs and the clamping of the elastomeric sleeve ends to the piston member and/or end caps is the time consuming, labor intensive, and expensive process of creating grooves/indentations and/or projections in both the outer diameter of the end caps and/or pistons, and the clamping rings to assure the flexible rubber sleeve does not slide out from between the end caps and/or piston and the ring.

Some examples of air actuators and springs and the end sealing devices thereon are shown in the following patents described below:

U.S. Pat. No. 3,788,628 discloses a pneumatic spring-type system including a structure for anchoring the inner ends of a flexible rolling sleeve. The sleeve is positioned between surfaces characterized by having a saw-toothed shape with a circumferential groove and rib on an inner circumferential surface and two ribs on an outer circumferential surface. The opposite sides of the grooves converge at predefined angles with predetermined and matching radii of curvatures, the combination of which provides a gripping action to hold the flexible sleeve firmly in place by means of the saw-tooth design in cooperation with the matching recess of the ring and sleeve flange.

U.S. Pat. No. 3,870,286 relates to a fluid spring wherein the ends of the rolling sleeve are secured by annular clamping rings which engage against the internal surface of the sleeve. The clamping ring secures the rolling sleeve to the working cylinder with the clamping ring containing an annular groove type deformation by which the rolling sleeve is held in place by virtue of this interacting groove-shaped design in combination with the clamping force exerted by the ring.

U.S. Pat. No. 4,489,474 relates to means for connecting a tubular flexible member to a piston which includes a recess near the piston end which is secured to a flexible member. The flexible member is wrapped over and around a ring-shaped fitting which secures the flexible member to the piston. The piston comprises a circumferentially extending recess adjacent to its end with the flexible sleeve being positioned and substantially filling the recess of the piston. The ring-shaped fitting is a conventional swaged ring and the end portion of the flexible member is trimmed from the portion extending from the piston ring with the flexible member substantially filling the recess of the shoulder of the piston. The piston employs a serrated edge to assist in griping of the flexible member.

U.S. Pat. No. 4,457,692 discloses an assembly for sealing two members, one of which has a cylindrical surface which supports the seal, wherein a sealing lip is provided to bear against the second member. A cylindrical surface supports the seal which comprises a hollow-cylindrical body having a lip which extends outwardly from the body with an elastomeric band circling the body to hold it firmly in place. The cylindrical surface contains a recess which extends circumferentially around the surface and receives a matching projecting element of the seal which extends from the inside diameter of the cylindrical body.

U.S. Pat. No. 4,573,692 discloses an assembly for sealing two members, one of which has a cylindrical surface which supports the seal, wherein a sealing lip is provided to bear against the second member. A cylindrical surface supports the seal which comprises a hollow-cylindrical body having a lip which extends outwardly from the body with an elastomeric band circling the body to hold it firmly in place. The cylindrical surface contains a recess which extends circumferentially around the surface and receives a matching projecting element of the seal which extends from the inside diameter of the cylindrical body.

U.S. Pat. No. 4,629,170 relates to a pneumatic spring with a pair of chambers formed by a pair of membranes that are sealingly attached to an axially spaced-apart retainer and piston wherein the axial end of the membrane is compressed between a serrated surface of a solid member and a retaining ring wherein the ring may be swaged, fitted or otherwise tightened to produce radial compression against the axial ends of the flexible membranes.

British Patent No. 199,789 discloses a metal securing band which grips a diaphragm and forces it against a tapered end portion of a tubular member.

U.S. Pat. No. 4,718,650 shows an air spring in which the ends of the flexible sleeves are connected to the sealing surfaces of a pair of axially spaced pistons by swaged crimped clamping rings. The piston clamping surfaces are formed with serrations for assisting to retain the elastomeric material when forced therein by the clamping rings.

U.S. Pat. Nos. 4,899,995 and 4,852,861 show the use of a clamp ring having a single centrally located recess which aligns with an outwardly extending projection formed on the sealing surface of the piston and end member in order to position the clamping ring on the piston or end member. A pair of pinch areas are formed on opposite sides of the projection by outwardly extending annular rings or surfaces on the sealing surfaces of the piston and/or end member. These rings form the pinch areas or zones in cooperation with the axially extending inner annular surface of the clamp ring on opposite sides of the concave recess.

Although each of the devices described in these patents satisfactorily performs its intended function, it has been found that the clamping and crimping is not always sufficient to prohibit failure of the sleeve-cap interface and particularly to prevent clamping/crimping failure (versus bellows or sleeve failure, i.e., tearing or bursting of the sleeve fabric).

SUMMARY OF THE INVENTION

Objectives of the invention include providing an improved sleeve-end cap interface and assembly for air actuators or springs having end caps axially spaced at opposite ends with a flexible elastomeric sleeve extending therebetween and clamped against the respective end caps by a clamp ring to form a fluid tight seal therebetween and provide an intervening pressured chamber.

A further objective of the invention is to provide an improved sleeve-end cap interface and assembly which reduces or eliminates clamping failures such that overall air actuator failure is reduced.

A further objective of the invention is to provide an improved sleeve-end cap interface and assembly where greater fabric displacement occurs in the crimped area thereby reducing or eliminating clamping failure.

A further objective of the invention is to provide an improved sleeve-end cap interface and assembly where the interface improves the holding power of the sleeve or bellows within the crimp.

A further objective of the invention is to provide an improved sleeve-end cap interface and assembly which strives to reduce air actuator failure to bellows or sleeve failure only.

A further objective of the invention is to provide an improved sleeve-end cap interface and assembly which provides interference between the ring and end cap rather than clearance as is found on the prior art.

A further objective of the invention is to provide an improved sleeve-end cap interface and assembly that provides a larger stress area thereby reducing ring stress and strain.

A further objective of the invention is to provide an improved sleeve-end cap interface and assembly which provides a new and improved forced distribution which results in a reduction of the ring stress and strain, greater fabric displacement, and the reduction or elimination of clamping failure.

A further objective of the invention is to provide an improved sleeve-end cap interface and assembly where the clamping ring is of a self-locking design.

A further objective of the invention is to provide such an improved end cap assembly in which the end cap clamping surface includes female or concave annular grooves separated by projections to facilitate efficient gripping of the elastomeric material therebetween and to alter the direction of the reinforcing cords contained within the elastomeric sleeve to further increase the clamping effect of the ring, and which construction positionally locates the clamp ring on the sealing surface of the end cap.

A further objective of the invention is to provide an improved sleeve-end cap interface and assembly in which the clamping ring and end cap clamping surface are generally parallel in nature but are of a generally tapered configuration such that the end cap is of a generally conical shape while a cross-section of the clamping ring is of a generally tear-drop or right triangular shape such that the two pieces correspond and fit together.

A further objective of the invention is to provide an improved end cap assembly on which a clamp ring is swaged to facilitate efficient gripping of the elastomeric material between the sealing surface on the end cap and the clamp ring.

A further objective of the invention is to provide an improved air actuator or spring that is designed to gravitate toward a sidewall burst rather than an end component or seal failure when over-pressure occurs within the fluid pressure chamber.

A further objective of the invention is to provide such an improved end cap assembly in which annular expansion grooves are formed between annular projections on the end cap sealing surfaces to permit the elastomeric material to flow therein.

A further objective of the invention is to provide annular grooves designed to receive and hold the sleeve better than prior art designs.

A further major object of the invention is to provide a clamp ring having a continuous smooth internal cylindrical surface providing a less expensive than heretofore used clamp rings having recesses or configured inner surfaces.

A further objective of the invention is to provide an improved sleeve-end cap interface and assembly that is usable with current crimping equipment.

A further objective of the invention is to provide an improved sleeve-end cap interface and assembly with the above improved features at the same cost as the current prior art air actuators.

A further objective of the invention is to provide an improved sleeve-end cap interface and assembly that is capable of being retrofitted to existing components that are presently used under standard and well-known operating conditions.

A further objective of the invention is to provide all of the above objectives and advantages as well as others that are apparent to one of skill in the art in the same invention.

These objectives and advantages are obtained by the improved air actuator of the invention, the general nature of which may be stated as including an outer surface and an inner surface. The outer surface is substantially parallel to the axis extending between the opposed end members. The inner surface is oblique to the outer surface, the inner surface being the sealing surface of the clamp ring that is crimped against the end member.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
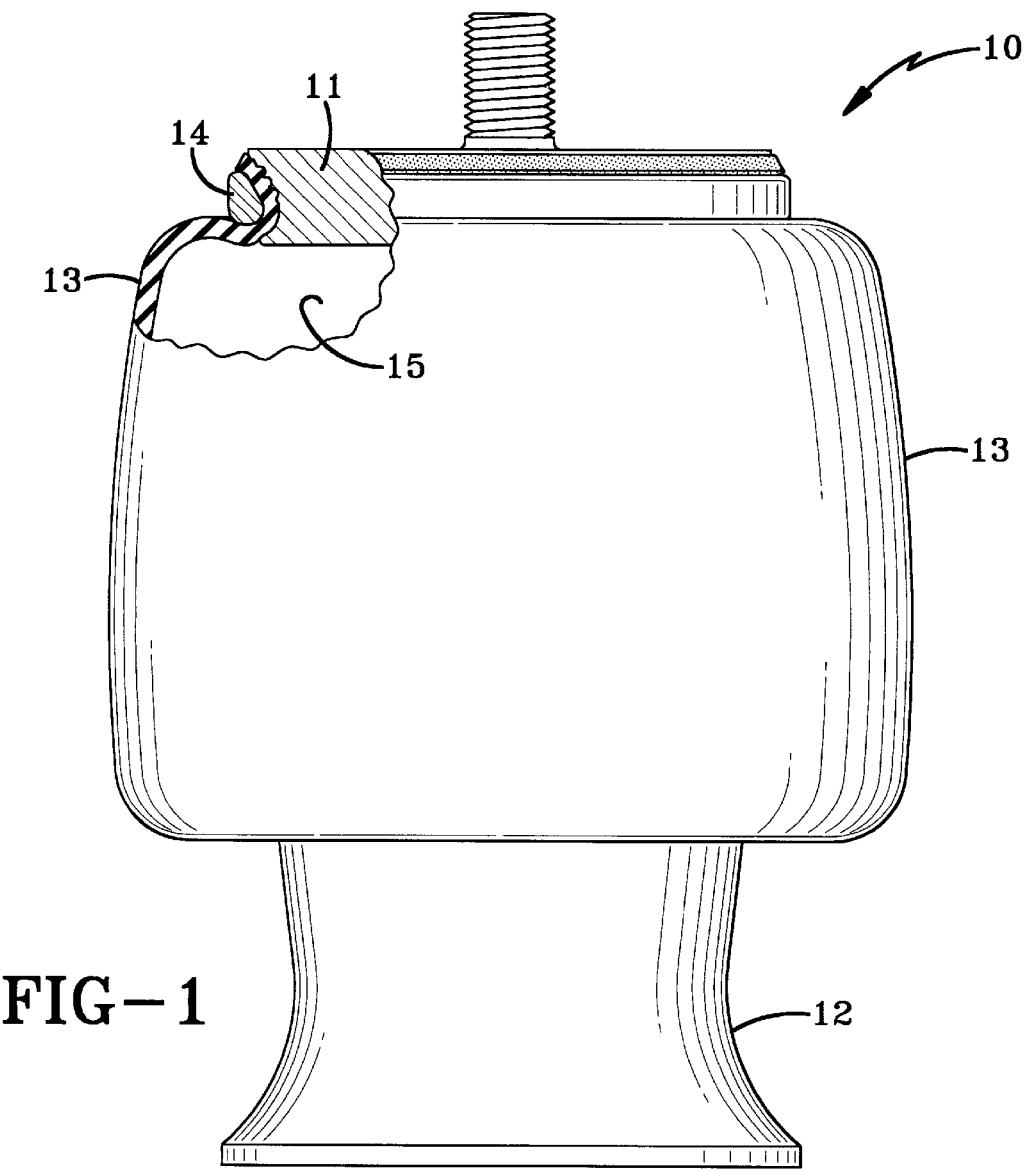
FIG. 1 is an elevational view of the improved end cap assembly incorporated into an air actuator with portions broken away and in section.
Figure 2:
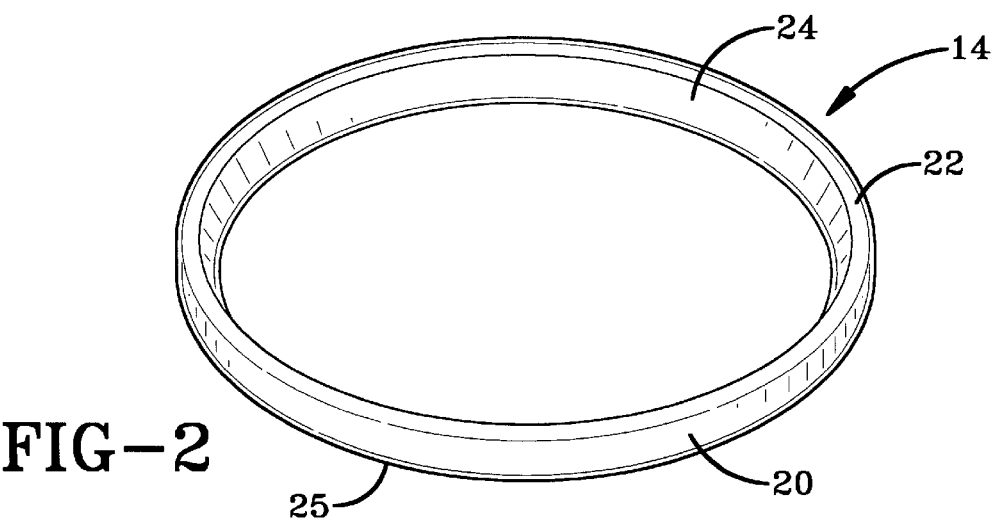
FIG. 2 is an enlarged perspective view of the clamp ring from FIG. 1.

The improved air spring of the invention is shown in FIG. 1 and indicated generally at 10. This air spring 10 may alternatively be any other type of air actuator whereby two end caps rather than an end cap and piston are used as is well-known in the art. Overall, the improved air spring 10 is shown in an at-rest position in FIG. 1, which is a perspective view of the air spring with a portion cut away to show the improved end cap and clamp ring as discussed below.

As will be clear to one of skill in the art after reading the following, the improved clamp ring and receiving surface as described below may be used on either an air spring or air actuator. In the case of air actuators, the actuator usually consists of a flexible rubber sleeve or bellows of similar or identical construction to that of an air spring as disclosed below. This flexible rubber sleeve or bellows contains a supply of compressed fluid and a feed for increasing or decreasing the compressed fluid therein. The flexible sleeve is formed of a flexible elastic material as described below and often contains reinforcing cords as described below, where the flexibility of the material permits a first end cap as described below with reference to air springs to move axially with respect to another end cap of similar construction to the first end cap as the amount of compressed fluid is changed. Each of these end caps is secured within the ends of the sleeve so as to define the compressed fluid chamber. Typically, the air actuator is positioned in between a movable or actuatable object and typically a fixed object, where the movable object moves in correlation to the axial movement provided by the air actuator. In general, the air actuator is functioning to cushion this movement by absorbing shock loads impressed on the air actuator.

As to the embodiments shown in FIG. 1, the device is an air spring rather than an air actuator although, as noted above, the invention applies to both since each require clamp rings and at least one end cap. As to these air springs, the construction is similar to the air actuator in that a flexible rubber sleeve or bellows contains a supply of compressible fluid. However, the air spring replaces one of the end caps with at least one piston movable with respect to the flexible sleeve. The piston causes compression and expansion of the fluid within the sleeve as the sleeve stretches or retracts, respectively, thereby absorbing shock loads and/or dampening vibrations.

Air spring 10 as shown in FIG. 1 includes axially spaced end members consisting of an improved end cap 11 and an improved piston 12. A flexible sleeve 13 of elastomeric material containing internal reinforcing cords extends between end cap 11 and piston 12, which are clampingly engaged within the open ends of sleeve 13 by improved clamp rings 14. Once fully assembled, sleeve 13 and end members 11 and 12 form an internal fluid pressure chamber 15 that is pressurized with a compressed fluid to thereby provide a dampening or shock absorbing system that serves to absorb shock loads and dampen vibrations. Specifically, this occurs as the piston 12 causes compression and expansion of the fluid within the sleeve as the sleeve stretches or retracts, respectively, thereby absorbing these shock loads and/or dampening these vibrations that are impressed on the vehicle axles by the wheel striking an object in the road or falling into a depression where the air actuator is used on a vehicle.

Figure 3:
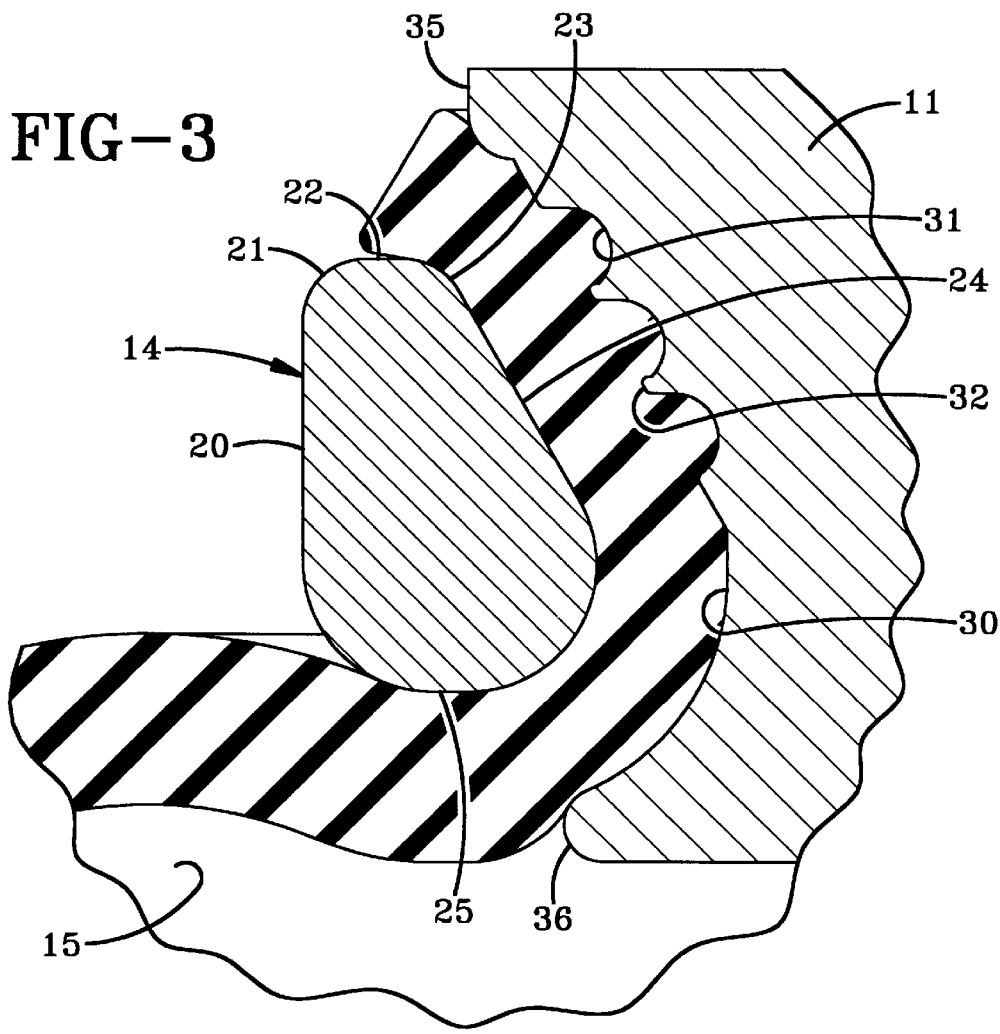
FIG. 3 is a greatly enlarged fragmentary sectional view showing a clamping ring securing one end of the elastomeric sleeve against the sealing surface of the improved end cap.
Figure 4:
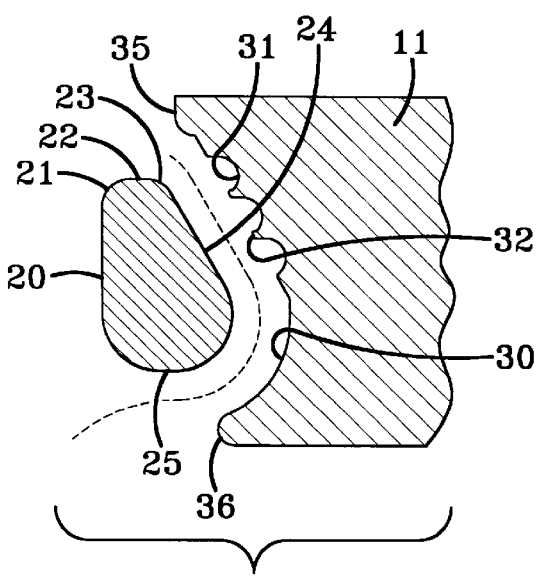
FIG. 4 is an enlarged sectional view of the interference fit of the air actuator of FIG. 1.
Figure 5:
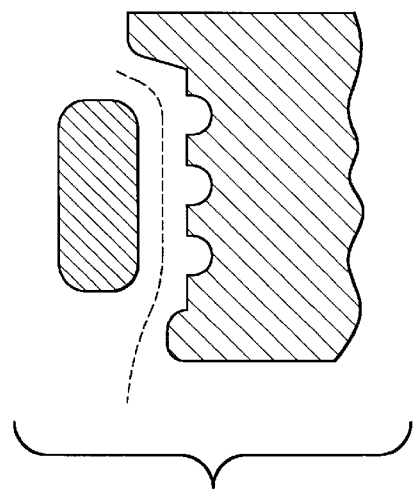
FIG. 5 is an enlarged sectional view of the clearance fit of a prior art air actuator.

In accordance with one of the main features of the present invention, improved clamp ring 14 is of a tear-drop shape as is mostly clearly shown in FIGS. 3 and 4. This improved shape is in contrast to the standard prior art clamp rings which are of a cross-sectional, rectangular or square shape as is shown in FIG. 5 with smooth or radiused corners. Specifically, clamp ring 14 is tear-drop shaped as shown in FIG. 4 whereby the clamp ring and cross-section includes an outer surface 20 which is generally parallel with the axis of motion extending between end cap 11 and piston 12, a 90° radiused turn 21, a top surface 22 which is generally perpendicular to surface 20, a rounded corner 23 of a substantially less than 90° radius, a tapered face 24 which is tapered at an angle in between the direction of surfaces 20 and 22, and a major curved base surface 25 that is preferably a curve exceeding 180°. The major curve 25 could alternatively be a first curve of greater than 90° coupled with a 90° curve whereby a short leg may appear therebetween of a flat configuration. The resulting cross-sectional shape of the clamp ring 14 is that of a tear-drop with a large base of a rounded design.

In accordance with another of the features of the present invention, each of the improved end cap 11 and improved piston 12 includes a sleeve sealing surface that is tapered such that end cap 11 and piston 12 have somewhat of a conical shape. This sealing surface 30 is in contrast to the prior art sealing surface which was generally flat so as to define a generally cylindrical end cap or piston (this is shown in FIG. 5). The sealing surface 30 which is shaped to configure with the tear-drop clamp ring 14 also includes in the most preferred embodiment, a plurality of annular grooves 31 therein with a plurality of projections 32 extending annularly therebetween.

In assembly, each end of the flexible sleeve 13 is sealingly clamped in a generally air-tight relationship against sealing surface 30 of end cap 11 or piston 12 by the smooth inner surface 24 of clamping ring 14, which is then swaged or otherwise compressed and crimped to seal the sleeve end against sealing surface 30. The result of this swaging is the forcing of the rubber sleeve 13 into annular grooves 31 so as to completely fill the grooves and compress the sleeve 13 in between inner surface 24 of the clamp ring 14 and the sealing surface 30 of the end cap 11 or piston 12. Any belts within the sleeve 13 are deformed and contoured by the grooves 31. As a result, knots of rubber sleeve with deformed belts therein are formed in grooves 31 which act to prevent the rubber from being pulled out the grooves.

In accordance with one of the main features of this invention, the resulting seal has an interference fit between the ring and the end cap or piston thereby preventing the ring from slipping off. This interference fit is shown clearly in FIG. 3 where the uppermost end 35 and the lowermost end 36 of end cap 11 extend outward from end cap 11 a distance radially further than the innermost point of clamp ring 14 which is substantially adjacent to the connection point of surface 24 with curve 25. This ring interference is critical as the prior art merely supplied a ring clearance even after crimped clamping.

In accordance with another of the main features of the invention, the unique tear-drop design results in greater fabric displacement thereby resulting in improved holding power of the bellows or sleeve crimp resulting in a reduction or elimination of crimp or clamp failure. Clearly, FIGS. 3–5 show a much greater fabric displacement radially inward by the unique tear-drop shaped clamp 14 versus the prior art clamping ring as shown in FIG. 5.

In accordance with another of the features of this invention, the unique design of the tear-drop shaped clamping member 14 supplies a unique forced diagram of the crimping force on sleeve 13 from clamp 14 against end cap 11 or piston 12. Rather than the prior art forces which were entirely radially in nature except for at the minimal radiused edges, the tear-drop shaped clamping ring 14 provides unique resulting and normal force components that are angled according to the unique taper of surface 24.

In further accordance with the features of this invention, the tear-drop shaped clamp ring 14 and corresponding sealing surface 30 provide an increased or larger stress area. This increased stress area results in a reduction of the ring stress and strain. Specifically, tests were performed in which it was determined that the stress area of a standard ring is approximately 0.020 area squared while the area of the tear-drop ring is approximately 0.043 area squared.

In further accordance with another features of the invention, during pressurization of the internal fluid pressure chamber 15, the flexible sleeve 13 wraps around the curved surface 25 as is shown best in FIG. 3, so as to create a normal force on the bellows as a result of the air pressure within the bellows thereby creating a self-locking mechanism. The self-locking mechanism prohibits the clamp ring 14 from sliding off of the end cap 11 or piston 12 resulting in a breaking of the seal between flexible sleeve 13 and end cap 11 or piston 12.

In sum, the improved tear-drop shaped clamp assembly and tapered end cap for an air spring creates a crimped design which will cause bellows or sleeve failure only or substantially improve the holding power of the bellows crimp. Furthermore, the improved invention is capable of use on current crimping equipment and is no more expensive than the current technology. Also, the invention involves a design that can be retrofitted to existing components. Some of the major advantages of the present invention are that it provides a much stronger holding power on the rubber bellows than a normal ring since testing has shown that burst results are typically at least twice as high as a standard ring. This improved holding power is the result of greater fabric displacement, ring/component interference as opposed to clearance, larger stress area, and a self-locking mechanism.

Although the above description describes throughout an air spring, it is readily understood that the "air spring" technology is equally applicable to air actuators or similar pneumatic components.

Accordingly, the improved air spring is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the air spring is constructed and used, the characteristics of the construction, and the advantageous, new and useful results obtained; the new and useful structures, devices, elements, arrangements, parts and combinations, are set forth in the appended claims.

What is claimed is:

1. A clamp ring in combination with an air spring having a pair of opposed end members axially aligned for movement in relation to one another along the axis and a flexible sleeve extending between the end members and forming an internal pressurizable chamber therebetween, at least one of the end members having an outer clamping surface, the clamp ring comprising:

an outer surface substantially parallel to the axis extending between the opposed end members; and an inner surface oblique to the other surface, the inner surface being the sealing surface of the clamp ring that is crimped against the outer clamping surface of the said one end member.

2. The clamp ring of claim 1 wherein the clamp ring further includes a top surface that is substantially perpendicular to the outer surface.

3. The clamp ring of claim 2 wherein the clamp ring further includes a substantially 90° curve between the outer surface and the top surface.

4. The clamp ring of claim 3 wherein the clamp ring further includes a less than 90° curve between the inner surface and the top surface.

5. The clamp ring of claim 4 wherein the clamp ring further includes a greater than 180° curve in between the inner and outer surfaces.

6. The clamp ring of claim 1 wherein the inner surface is angled with reference to the outer surface.

7. The clamp ring of claim 1 wherein the clamp ring further includes radiused edges in between the inner and outer surfaces.

8. The clamp ring of claim 1 wherein the clamp ring further includes a greater than 180° curve in between the inner and outer surfaces.

9. The clamp ring of claim 1 wherein the outer clamping surface of the said one end member includes a plurality of annular grooves.

10. An air spring comprising:

a pair of end members axially spaced apart and movable toward and away from one another, at least one of the end members having a sealing surface thereon which is tapered in relation to the axis between the end members;

a flexible sleeve extending in between the end members and forming an internal pressurizable chamber; and a clamp ring corresponding to each sealing surface, each clamp ring having a tear-drop shaped cross section which includes an outer surface parallel to the axis between end members and an inner surface oblique thereto.

11. The air spring of claim 10 wherein the clamp ring includes a top surface that is substantially perpendicular to the outer surface.

12. The clamp ring of claim 11 wherein the clamp ring further includes a substantially 90° curve between the outer surface and the top surface.

13. The clamp ring of claim 12 wherein the clamp ring further includes a less than 90° curve between the inner surface and the top surface.

14. The clamp ring of claim 13 wherein the clamp ring further includes a greater than 180° curve in between the inner and outer surfaces.

15. The air spring of claim 10 wherein each clamp ring includes a surface substantially parallel to the sealing surface.

16. The air spring of claim 10 wherein the sealing surface includes a plurality of annular grooves.

17. The air spring of claim 10 wherein the clamp ring provides clamp ring interference.

18. The air spring of claim 10 wherein each of the end members is conical shaped.

* * * * *